(12) United States Patent
Moon

(10) Patent No.: US 8,116,289 B2
(45) Date of Patent: Feb. 14, 2012

(54) INTERNETWORKING NODES BASED ON CONNECTIONS, MEMBERSHIP, AND LOCATION

(75) Inventor: Billy G. Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 11/468,456

(22) Filed: Aug. 30, 2006

(65) Prior Publication Data

US 2008/0056282 A1 Mar. 6, 2008

(51) Int. Cl.
*H04Q 7/24* (2006.01)
*H04L 12/28* (2006.01)

(52) U.S. Cl. .......... 370/338; 370/401
(58) Field of Classification Search .......... 370/331, 370/338, 339, 392, 401; 455/433
See application file for complete search history.

(56) References Cited

U.S. PATENT DOCUMENTS

| | | | | |
|---|---|---|---|---|
| 5,649,299 | A * | 7/1997 | Battin et al. | 455/62 |
| 5,901,353 | A * | 5/1999 | Pentikainen | 455/433 |
| 6,424,629 | B1 * | 7/2002 | Rubino et al. | 370/241.1 |
| 6,628,612 | B1 * | 9/2003 | Sabry et al. | 370/230 |
| 6,725,263 | B1 * | 4/2004 | Torres | 709/223 |
| 6,731,932 | B1 * | 5/2004 | Rune et al. | 455/432.1 |
| 6,810,250 | B2 * | 10/2004 | Jo et al. | 455/433 |
| 7,409,452 | B2 * | 8/2008 | Ragnet et al. | 709/227 |
| 7,428,209 | B1 * | 9/2008 | Roberts | 370/217 |
| 2001/0055306 | A1 * | 12/2001 | Nakatsugawa et al. | 370/392 |
| 2003/0189896 | A1 * | 10/2003 | Dang et al. | 370/217 |
| 2003/0214929 | A1 * | 11/2003 | Bichot et al. | 370/338 |
| 2003/0214955 | A1 * | 11/2003 | Kim | 370/400 |
| 2004/0018839 | A1 | 1/2004 | Andric et al. | |
| 2004/0081105 | A1 * | 4/2004 | Shimazaki et al. | 370/254 |
| 2004/0156346 | A1 * | 8/2004 | O'Neill | 370/338 |
| 2005/0041676 | A1 | 2/2005 | Weinstein et al. | |
| 2005/0157698 | A1 * | 7/2005 | Park et al. | 370/351 |
| 2006/0126565 | A1 * | 6/2006 | Shaheen | 370/331 |
| 2006/0153191 | A1 * | 7/2006 | Rajsic et al. | 370/392 |
| 2006/0235937 | A1 * | 10/2006 | Wu et al. | 709/214 |
| 2007/0053295 | A1 * | 3/2007 | Cleveland et al. | 370/235 |

* cited by examiner

*Primary Examiner* — Hong Cho
(74) *Attorney, Agent, or Firm* — P. Su

(57) ABSTRACT

Methods and apparatus for inter-networking nodes are disclosed. According to one aspect of the present invention, a node arrangement includes a services engine, a communications engine, and a transport engine. The services engine includes at least a first service domain that provides at least one service associated with a first community of interest. The communications engine provides at least a first forwarding table which is associated with the first community of interest and arranged to support reachability for the first service domain. The transport engine manages the zero or more exterior connections associated with the node arrangement.

20 Claims, 6 Drawing Sheets

INTERNETWORKING NODES BASED ON CONNECTIONS, MEMBERSHIP, AND LOCATION

BACKGROUND OF THE INVENTION

1. Field of Invention

The present invention relates generally to networks. More particularly, the present invention relates to a method and an apparatus which allows a node in an overall network to utilize host services from different and distinct service domains.

2. Description of the Related Art

Traditional networks are built around a hierarchy of nested networks. In the current inter-networking framework, scalability and the ability to handle social networks are often problematic. The current inter-networking framework does not permit scaling by a large factor. For instance, it may not be possible to scale the current inter-networking framework by a factor that is likely to be required to accommodate an anticipated growth in network node count, e.g., a factor of approximately 10,000 or approximately 100,000. It typically takes approximately two and a half days to converge a new core network that is added to the inter-networking framework, e.g., the Internet, using a border gateway protocol (BGP). As such, converging a large number of new networks is generally not conceivable.

A hierarchy on which traditional networks are built involves networks that are sub-netted and allocated to physical campuses. Typically, a node is attached to a "room" within an enterprise and, hence, is considered as belonging to the enterprise. Each node is a member of a single enterprise at any given time. As such, the enterprise that a node is currently connected to is considered to be the enterprise that the node is a member of. Even when the node is roaming, e.g., not physically located in the room to which it is assigned, and is hosted by a foreign network, the node tunnels back to its room such that the hierarchy of its network is maintained.

Two nodes which are associated with a first enterprise may roam away from the first enterprise, but may share a hot spot or a public wireless access point associated with a different enterprise, e.g., a new hosting enterprise, in a given location. In other words, nodes that are typically members of one social network such as the first enterprise may instead at least temporarily join another social network such as the new hosting enterprise. If the two nodes wish to communicate with each other, the nodes may tunnel back to the first enterprise and communicate with each other via the enterprise network associated with the first enterprise. In this case, the packets transmitted by one node are tunneled back to the first enterprise before being retunneled to the other node, which is inefficient given that the two nodes are at substantially the same location. Alternatively, the nodes may operate on the new hosting enterprise such that packets sent from one node are received by the other node via the new hosting enterprise. Although the transmitting of packets from one node to the other node via the new hosting enterprise is relatively efficient, the nodes are not able to communicate with any other nodes associated with the first enterprise.

A node may be a laptop computer that a worker of an organization may use in different locations, such as at his office and at his home. While in his office, e.g., his room, the worker may connect his laptop computer substantially directly to his work enterprise network. While in his home, the worker may effectively connect his laptop computer to his work enterprise network by utilizing a virtual private network (VPN). However, in order for the laptop computer to be connected to the work enterprise network of the worker, the laptop computer effectively relinquishes membership in a home enterprise network. Hence, the laptop computer may only use services provided by the work enterprise network and may not substantially simultaneously use services provided by the home enterprise network, and vice versa. The inability for the laptop computer to utilize services of both the work enterprise network and the home enterprise network is inefficient. By way of example, if the worker wishes to download print a document from the work enterprise network for printing on a printer of the home enterprise network, the worker would generally need to tunnel to the work enterprise network, download the document and store the document on the laptop computer, disconnect from the work enterprise network, and then join the home enterprise network before printing.

Therefore, what is needed is an inter-networking framework that allows new networks to be efficiently converged, and also allows nodes to concurrently be members of more than one social network. That is, what is desired is a scaleable inter-networking framework that allows a node to host services from different and distinct service domains.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

A network framework which allows a node included therein to play different roles in different enterprises substantially concurrently allows services associated with different enterprises to be used efficiently. By way of example, a first node may be connected directly to a second node, and also via a virtual private network (VPN) to an enterprise, such that the first node may communicate substantially directly with the second node and also with entities associated with the VPN.

Rather than maintaining a full mesh of each possible connection between a node and every service domain, e.g., instead of assuming that all nodes in an overall network are uniformly distributed, a selected mesh may be maintained. A selected mesh may include connections between the node and enterprises that the node is probabilistically likely to access. If the node requests access to an enterprise that is not in the selected mesh, the node may discover a connection to that enterprise through a location search. The efficiency with which core networks may be converged is enhanced if a convergence process is generally initiated relative to enterprises that the core networks are likely to access. Hence, the scalability of an overall network is enhanced.

In one embodiment, a node that is a part of a selected mesh is in one location at any point in time, though the location at which the node is located may be nested within other locations. A node also has a finite and relatively small number of connections, as for example zero or more connections. Additionally, a node has one or more social memberships or communities of interest which may be associated with different enterprises. The number of connections generally changes rapidly, while the social memberships or communities of interest associated with a node typically change relatively slowly.

Figure 1A:
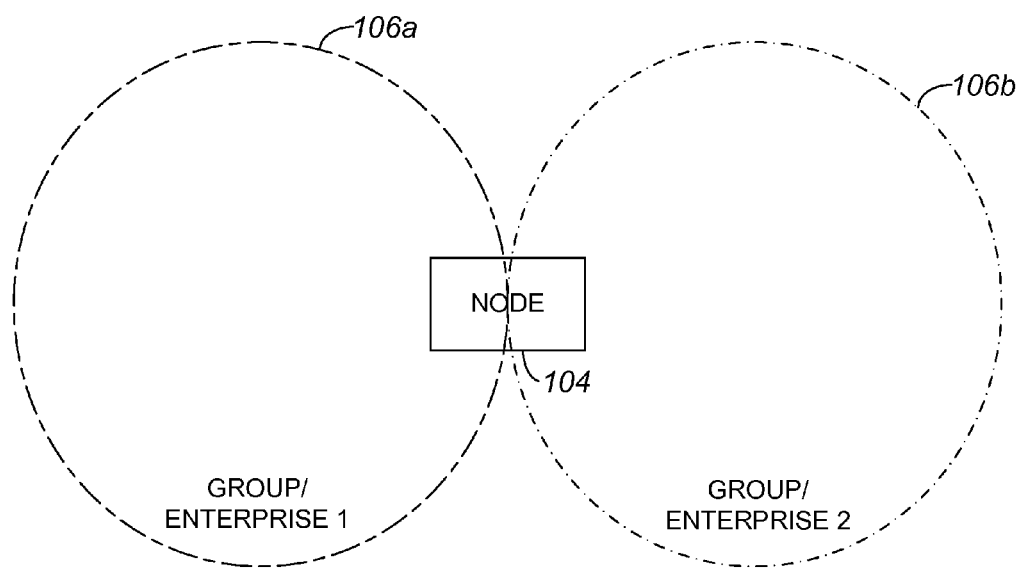
FIG. 1A is a diagrammatic representation of a system in which a node is a member of more than one group in accordance with an embodiment of the present invention.

FIG. 1A is a diagrammatic representation of a system in which a node is a member of more than one social group or community of interest in accordance with an embodiment of the present invention. A node 104 is a member of a plurality of social groups 106a, 106b that includes a first social group 106a and a second social group 106b. In general, node 104 may be located substantially anywhere, e.g., in a physical location that is part of at least one of groups 106a, 106b or in a virtual location relative to at least one of groups 106a, 106b. Social groups 106a, 106b may be part of different enterprises.

Figure 1B:
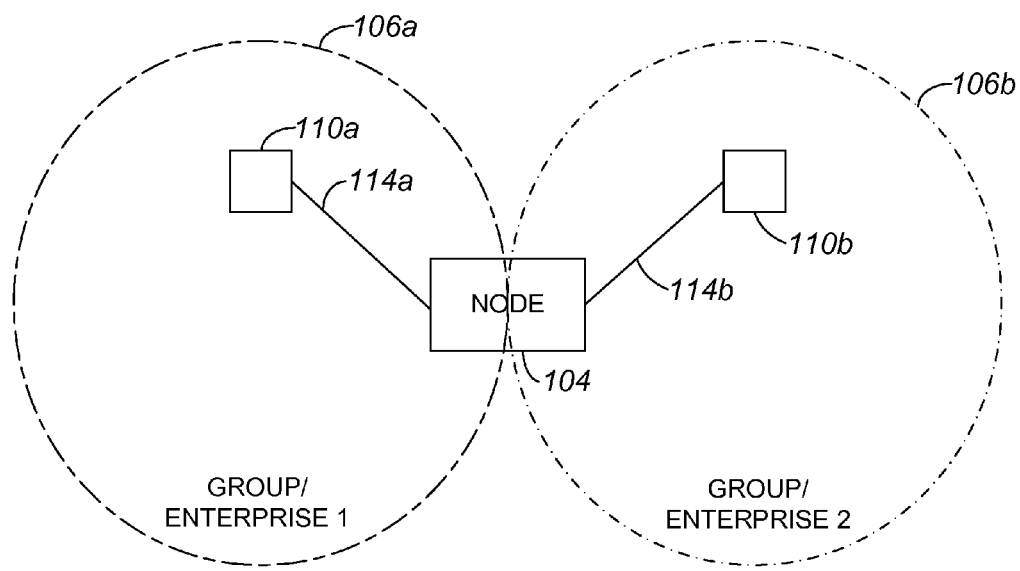
FIG. 1B is a diagrammatic representation of a system in which a node, i.e., node 104 of FIG. 1A, has substantially simultaneous connections to elements in different groups in accordance with an embodiment of the present invention.

As shown in FIG. 1B, node 104 may have connections 114a, 114b to entities 110a, 110b, respectively. That is, node 104 may maintain an active connection 114a to entity 110a of group 106a, and an active connection 114b to entity 110b of group 106b. Hence, node 104 may access functionality and services provided by entities 110a, 110b substantially concurrently. By way of example, although entity 110a is a member of group 106a and entity 110b is a member of group 106b, a document stored on entity 110a may be substantially directly provided to entity 110b by node 104 without first storing the document in node 104.

To enable node 104 to be a member of group 106a and group 106b, i.e., to enable node 104 to be a member of more than one social group or enterprise, node 104 may be a virtual node or may include a virtual node. Similarly, entities 110a, 110b may also be virtual nodes or include virtual nodes. A virtual node may be substantially any arrangement that provides a service. It should be appreciated that while a virtual node may have a physical location, a virtual node may instead have attributes but no real physical location. For instance, a virtual node may be a network element, a computing device, or a collection of devices that provides a service. Alternatively, a virtual node may be a mobile agent or a distributed application that is effectively constructed from parts of other applications that are running on various network elements.

Figure 2:
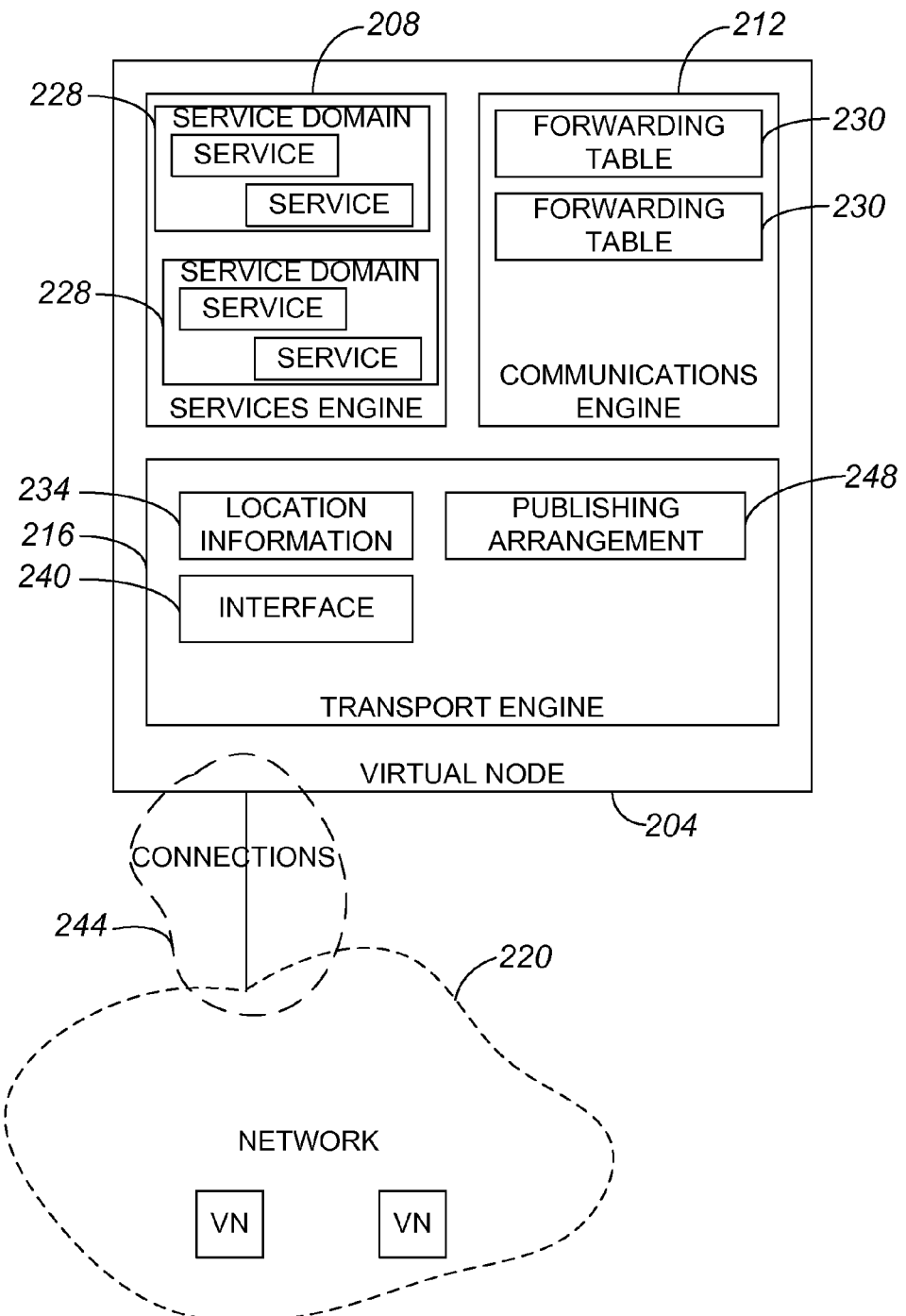
FIG. 2 is a diagrammatic representation of a virtual node in accordance with an embodiment of the present invention.

With reference to FIG. 2, a virtual node will be described in accordance with an embodiment of the present invention. A virtual node 204 may be in communication with an overall network 220 that includes any number of virtual nodes. In one embodiment, virtual node 204 may be a part of overall network 220. Virtual node 204 includes a services engine 208, a communications engine 212, and a transport engine 216. Services engine 208, communications engine 212, and transport engine 216 may be implemented as hardware logic devices, software logic devices that are stored on media, or a combination of both hardware logic devices and software logic devices.

Services engine 208 includes service domains 228 which administer collections of services. Services may include, but are not limited to, printing services, document management services, voice services, video services, e-mail services, web services, collaboration services, storage services, computing services, security services, presence services, and location-based services. Typically, services engine 208 includes at least one collection of services and, hence, at least one service domain 228. Each service domain 228 is an administrative domain for a particular collection of services that is associated with a given social group or community of interest. Hence, for a "home" social group or community of interest, a service domain 228 may contain at least some of the services for the home social group.

Communications engine 212 is arranged to provide routing functionality and firewalls. The routing functionality may support both interior routing within virtual node 204 and exterior routing. Further, communications engine 212 is arranged to provide border protection between service domains 228 associated with virtual node 204, between service domains 228 and transport engine 216, as well as between virtual node 204 and virtual nodes associated with network 220. Communications engine 212 maintains forwarding or routing tables 230 for service domains 228 to support global reachability for each service domain 228. In other words, each service domain 228 uses an associated forwarding table 230 to identify a route to use to reach a desired entity such as a virtual node within network 204. Transport engine 216 provides an interface 240 to any exterior connections or links 244, e.g., links to virtual nodes within network 220. Hence, transport engine 216 maintains the zero or more connections or links 244 that may exist between virtual node 204 and virtual nodes within network 220. Interface 240 may provide interfaces to links 244 including, but not limited to, WiFi links, WiMAX links, cellular links, and Ethernet links. Such links 244 are typically outside of service domains 228, and are not necessarily owned by the same social group or enterprise.

To facilitate the creation and the maintenance of connections or links 244, transport engine 216 includes an arrangement 248 that publishes service domains 228 that are hosted by virtual node 204 and service domains that virtual node 204 wishes to connect with. The service domains published by arrangement 248 may be published as a list that is accessible by a transport layer, i.e., layer 4 of a seven layer Open Systems Interconnection (OSI) model. A transport layer may then select links 244 that are appropriate for communications engine 212 to utilize to establish global reach on behalf of service domains 228.

Transport engine 216 also provides location information 234 that provides a context that may be used to select appropriate links 224 to use to establish global reach on behalf of service domains 228. Transport engine 216 may publicize location information 234 to services engine 208, e.g., via communications engine 212, for use by services. Location information 234 may include, but is not limited to, the position of virtual node 204, the orientation of virtual node 204, the velocity of virtual node 204, and the acceleration of virtual node 204.

Figure 3:
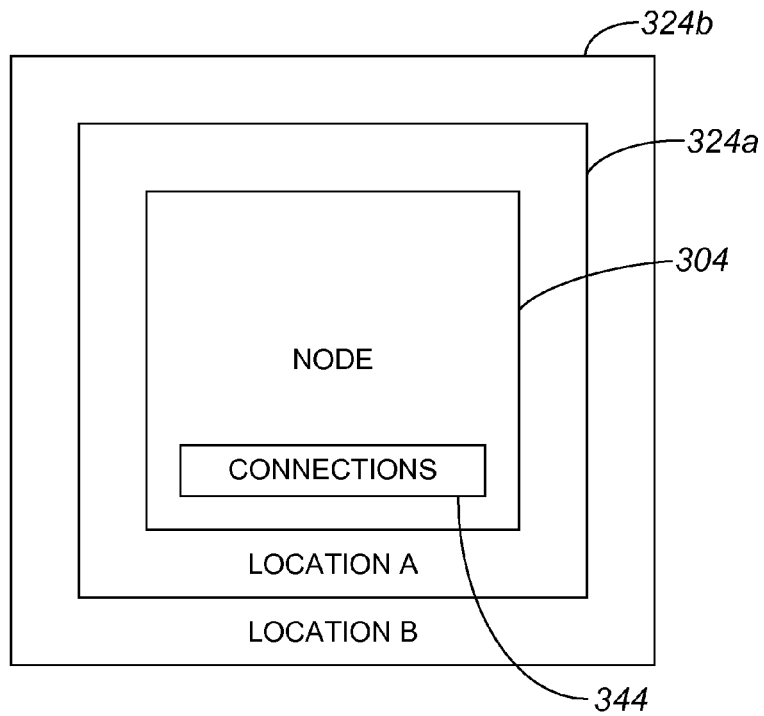
FIG. 3 is a diagrammatic representation of a virtual node with nested locations in accordance with an embodiment of the present invention.

A node that is or includes a virtual node such as virtual node 204 has a location, and is a member of at least one social group or community of interest. A node itself is considered to be a social group or a community of interest. At any point in time, a node is in one location, though the location may be nested within other locations. FIG. 3 is a diagrammatic representation of a node with nested locations in accordance with an embodiment of the present invention. A node 304, which may be a virtual node as described above with respect to FIG. 2, has connections 344 that allow node 304 to communication with a location "A" 324a that node 304 is nested in. Connections 344 also allow node 304 to communicate with a location "B" 324b that location "A" 324a is nested in. By way of example, node 304 may be a computing device that is located in location "A" 324a which is an office and location "B" 324b which is a floor of a building on which the office is located.

Node 304 is a member of a community of interest that includes substantially only node 304. Node 304 is also a member of a community of interest for location "A" 324a, and a member of a community of interest for location "B" 324b. Hence, any routes between node 304 and other nodes (not shown) that are members of the communities of interest for node 304 are maintained with a relatively high priority, as node 304 is more likely to communicate with another member of one of its communities of interest than with other nodes (not shown) that are not members of one of its communities of interest.

In some instances, node 304 may request a connection to another node (not shown) that is not a member of one of its communities of interest. To locate the other node (not shown), and therefore establish a temporary community of interest with the other node, node 304 may initiate a querying process to ascertain the location of the other node. Location "B" 324b is generally aware of all connections to location "B" 324b. Hence, if node 304 attempts to locate another node (not shown) that is connected to location "B" 324b, node 304 may query location "A" 324a. If location "A" 324a is not aware of the location of the other node (not shown), location "A" 324a may query location "B" 324b.

Alternatively, if an external node (not shown) that does not share a community of interest attempts to locate node 304, the external node may initiate a querying process that includes querying location "B" 324b to locate node 304. One querying process that may be used to locate node 304 will be described below with respect to FIG. 7.

Figure 4A:
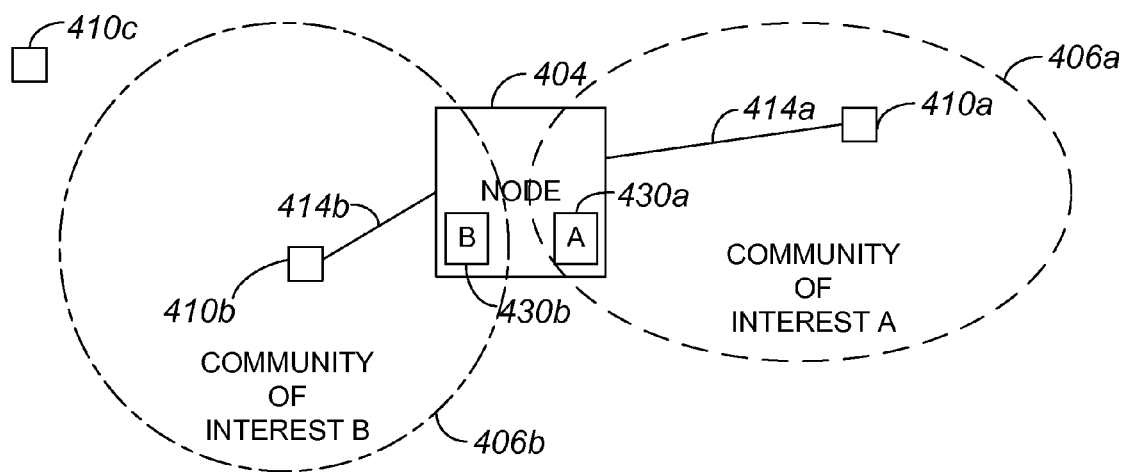
FIG. 4A is a diagrammatic representation of a virtual node that is in communication with elements in a plurality of communities of interest in accordance with an embodiment of the present invention.

Each community of interest has an associated forwarding table. As previously mentioned, each social group or community of interest has a service domain, and each service domain has a forwarding table. As each connection or link associated with a node may be associated with a different community of interest, the node may communicate with different communities of interest substantially concurrently. FIG. 4A is a diagrammatic representation of a node that is in communication with elements in a plurality of communities of interest in accordance with an embodiment of the present invention. A node 404 is a member of a community of interest "A" 406a and a community of interest "B" 406b. A forwarding table 430a is associated with community of interest "A" 406a, and provides information that node 404 may use to establish a route or a path 414a to a node 410a. A forwarding table 430b is associated with community of interest "B" 406b, and provides information that node 404 may use to establish a path 414b to a node 410b.

Node 404 may request a connection or a link to a node 410c that is not a member of an established, e.g., substantially permanent, community of interest such as community of interest "A" 406a and community of interest "B" 406b. In one embodiment, nodes 410a, 410b, 410c are virtual nodes, as described above with respect to FIG. 2. As node 410c is not in either community of interest "A" 406a or community of interest "B" 406b, node 404 performs a location search to identify a route to node 410c. In other words, node 410c is discovered through a search that utilizes locations. To discover a route or a path to node 410c, node 404 first checks its "container." By way of example, if node 404 is on the floor of a building, the floor may be a parent container for node 404 as well as other nodes, and the building may be a parent container for the floor. When node 404 checks its parent container, a recursive search 404 may be invoked until a container is found that knows a path to node 410c. Such a recursive search may involve the parent container of node 404 checking its associated parent container to ascertain whether the parent container of the parent container of node 404 knows a path to node 410c. Recursive searching may occur until a container that knows a path to node 410c is located.

Figure 4B:
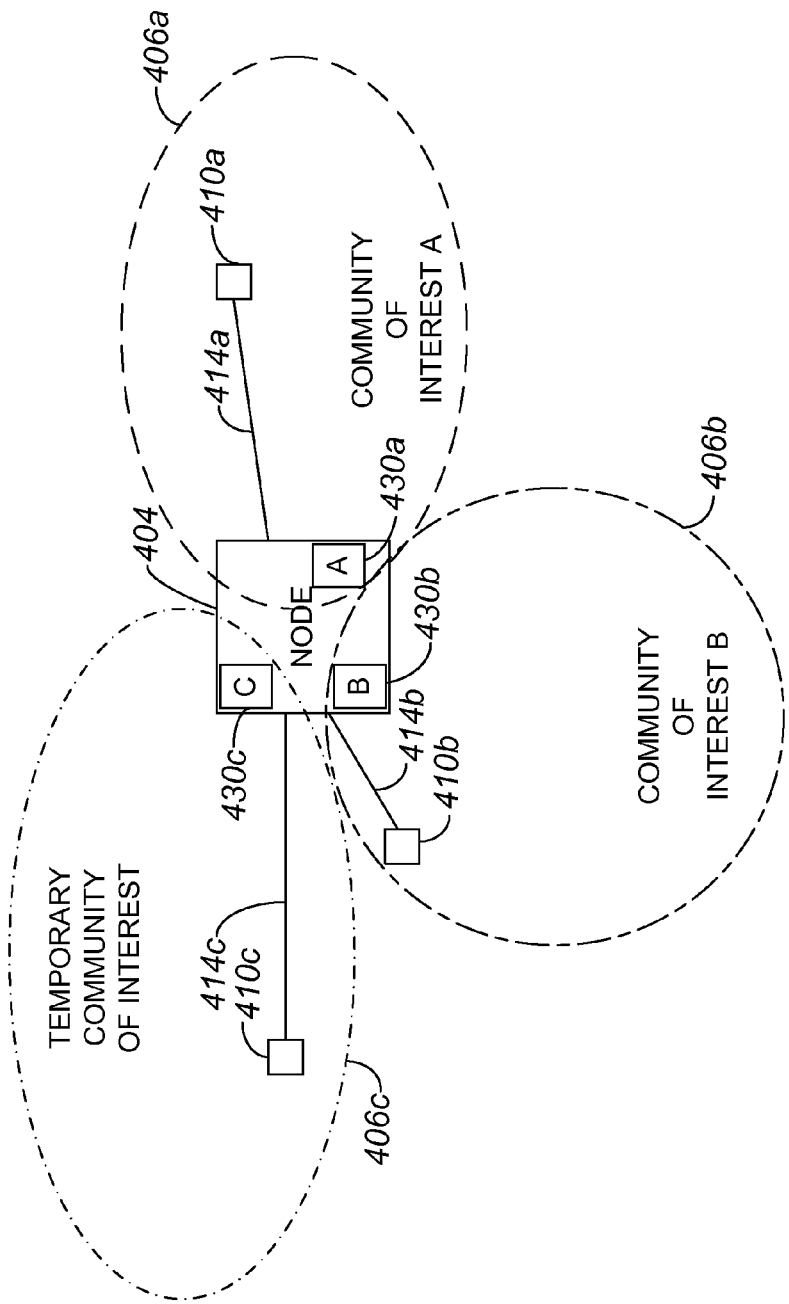
FIG. 4B is a diagrammatic representation of a virtual node, i.e., virtual node 404 of FIG. 4A, that is in communication with elements including an element associated with a temporary community of interest in accordance with an embodiment of the present invention.

As shown in FIG. 4B, once a path 414c is discovered from node 404 to node 410c, a temporary community of interest 406c is effectively established that includes node 404 and node 410c. Hence, a forwarding table 430c associated with temporary community of interest 406c is created and stored in node 404. The establishment of temporary community of interest 406c allows node 404 to effectively track node 410c. Path 414c and, hence, temporary community of interest 406c may be maintained until node 404 no longer desires access to node 410c.

Figure 5:
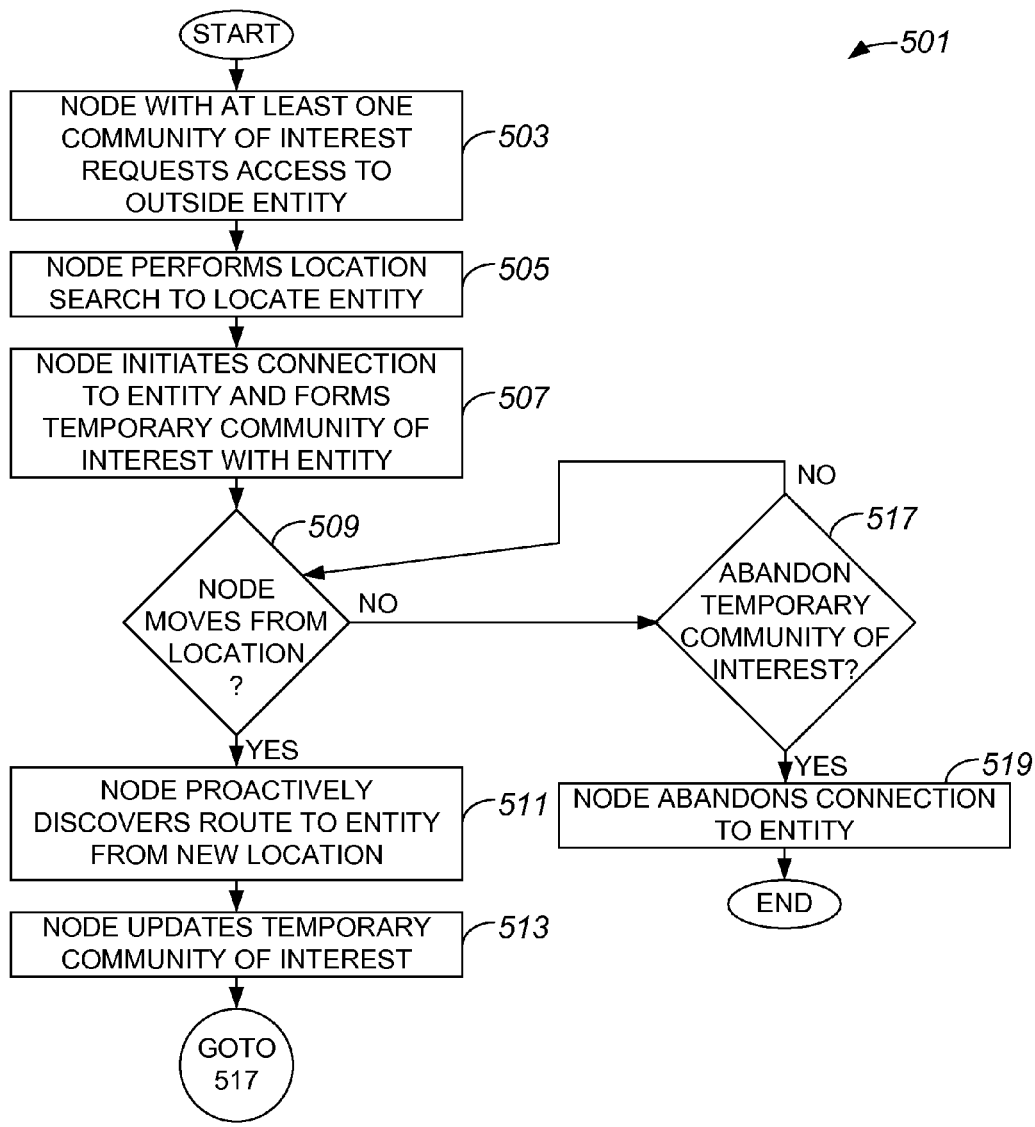
FIG. 5 is a process flow diagram which illustrates steps associated with a method of maintaining a temporary community of interest in accordance with an embodiment of the present invention.

FIG. 5 is a process flow diagram which illustrates steps associated with a method of maintaining a temporary community of interest in accordance with an embodiment of the present invention. A process 501 of creating and maintaining a temporary community of interest begins at step 503 in which a node, e.g., a virtual node, with at least one community of interest request access to an outside entity. That is, a node may request access to another node or a service offered outside of its community of interest. In step 505, the node performs a location search to locate the entity. Performing a location search may include initiating a querying process to establish a route from the node to the entity. In one embodiment, a querying process may include querying a first location which, in turn, queries a second location nested therein to ascertain whether the entity is nested in the first and second locations.

Once a location search is performed, the node initiates a connection to the entity and forms a temporary community of interest with the entity in step 507. Initiating a connection and forming a temporary community of interest generally includes creating or otherwise setting up a forwarding table that identifies a route to be taken by data or information that is being forwarded from the node to the entity.

A determination is made in step 509 as to whether the node has moved from its location, e.g., whether the node has moved from the location in which it was located when the location search of step 505 was performed. Such a determination may be made periodically or when there is an indication that the node may have moved. If it is determined that the node has not moved, process flow proceeds to step 517 in which it is determined whether to abandon the temporary community of interest. Abandoning a temporary community of interest generally includes abandoning a point-to-point, or otherwise unique, connection between the node and the entity. In one embodiment, a determination of whether to abandon the temporary community of interest may include determining whether the node has accessed services provided by the entity, or otherwise communicated with the entity, within a predetermined time period. The temporary community of interest may be abandoned if the entity has not been accessed by the node within the predetermined time period.

If it is determined in step 517 that the temporary community of interest is to be abandoned, the node abandons the connection to the entity in step 519, and the process of creating and maintaining a temporary community of interest is completed. Abandoning the connection typically includes deleting the forwarding table associated with the temporary community of interest. Alternatively, if the determination in step 517 is that the temporary community of interest is not to be abandoned, process flow returns to step 509 in which a determination is made as to whether the node has moved from its location.

If the determination in step 509 is that the node has moved from its location, e.g., whether the node has moved from the location in which it was located when the location search of step 505 was performed, then the node proactively discovers a new route to the entity in step 511. That is, the node identifies a route from the new location at which it is located to the entity, e.g., using a querying process.

After the node discovers a new route to the entity, the node updates the temporary community of interest in step 513. The node updates the temporary community of interest to encompass the new location of the node. In updating the temporary community of interest, the node also updates the forwarding table associated with the temporary community of interest. It should be appreciated that if the forwarding table associated with the temporary community of interest may not be updated, the forwarding table may instead be replaced with a new forwarding table. Once the temporary community of interest is updated, process flow moves to step 517 in which it is determined if the temporary community of interest is to be abandoned.

Figure 6:
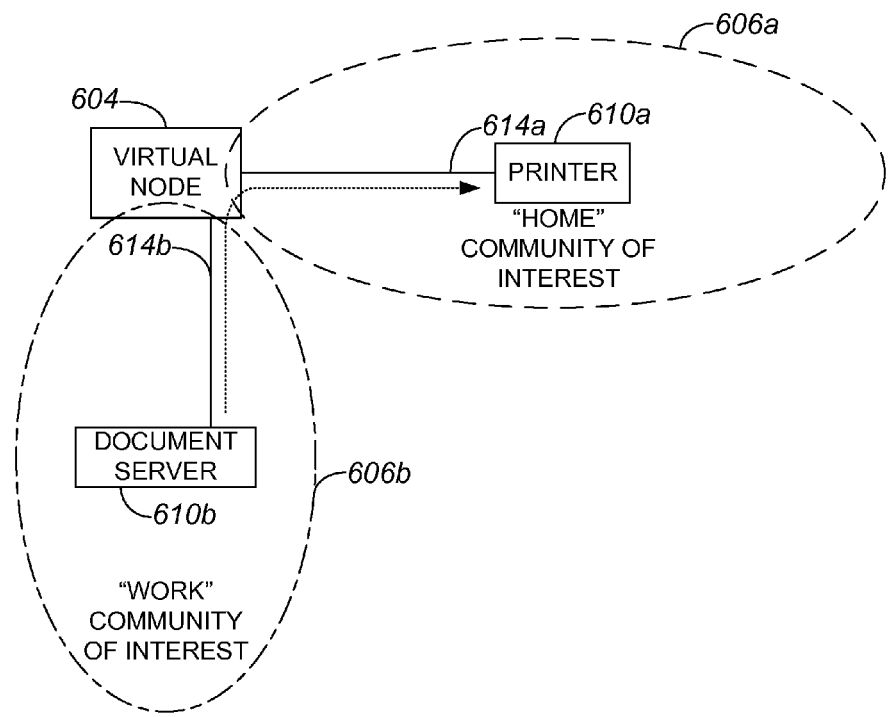
FIG. 6 is a diagrammatic representation of a system in which a virtual node is a member of two communities of interest such that services of both communities of interest may be used in accordance with an embodiment of the present invention.

A virtual node that is a member of more than one community of interest may be include computing device. The computing device may substantially simultaneously be a member of a "work" community of interest, e.g., a work community of interest accessed through a first connection to a VPN, and a "home" community of interest, e.g., a home community of interest that is accessed through a second connection. As the computing device is concurrently an active member of two communities of interest, the computing device may utilize services associated with both communities of interest. FIG. 6 is a diagrammatic representation of a system in which a virtual node is an active member of a plurality of communities of interest substantially simultaneously in accordance with an embodiment of the present invention. A virtual node 604 may be substantially any system which includes a services engine, a communications engine, and a transport engine. Virtual node 604 is an active, e.g., on-line, member of a home community of interest 606*a* and a work community of interest 614*b*. In the described embodiment, home community of interest 606*a* and work community of interest 614*b* reflect different social memberships, and are associated with different enterprises.

A connection 614*a*, which may be a point-to-point connection, allows virtual node 604 to communicate with a printer 610*a* included in home community of interest 606*a*. In general, printer 610*a* is a device that provides a service to virtual node 604. A connection 614*b* enables virtual node 604 to communicate with a document server 610*b* in work community of interest 606*b*.

Because virtual node 604 may access both printer 610*a* and document server 610*b*, virtual node may facilitate the printing of a document stored on document server 610*b* by printer 610*a*. Hence, a document associated with work community of interest 606*b* may be printed by printer 610*a*, which is associated with home community of interest 606*a*. That is, a document obtained from one enterprise may be printed on printer 610 of another enterprise. The transport engine of virtual node 604 manages connections 614*a*, 614*b* such that a document accessed via connection 614*a* may be provided to printer 610*a* over connection 614*a* for printing. Further, a communications engine of virtual node 604 may ensure that any firewall issues may be mitigated such that a document accessed via connection 614*a* may be provided to printer 610*a*.

Figure 7:
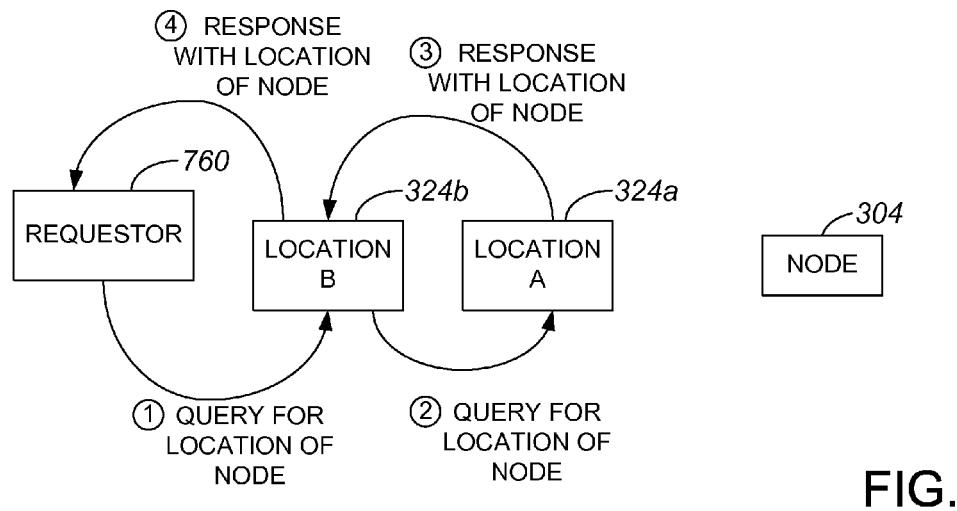
FIG. 7 is a diagrammatic representation of a process of ascertaining a location of a node through querying in accordance with an embodiment of the present invention.

As previously mentioned, to establish a community of interest between a first node or entity and a second node or entity, the location of second node or entity is ascertained by the first node or entity through a querying process. By way of example, if a requester attempts to establish a community of interest or a social membership with node 304 of FIG. 3, the requester initiates a querying process to determine the location of node 304. With reference to FIG. 7, the use of a querying process by a requester to locate node 304 of FIG. 3 will be described in accordance with an embodiment of the present invention. Node 304, as shown in FIG. 3, is nested in location A 324*a* which is nested in location B 324*b*. A requester 706 that requests the location of node 304 may be a virtual node that is attempting to establish a community of interest, e.g., a temporary community of interest, with node 304.

Requestor 760 queries location B 324B for the location of node 304. As location B 324*b* is able to identify node 304 as being nested somewhere within location B 324*b*, location B 324*b* may query location A 324*a* for the location of node 304. As location A 324*a* is aware of the actual location of node 304, location A 324*a* sends a response to location B 324*b* that identifies the location of node 304. Location B 324*b* may then send a response to requester 760 that includes the location of node 304. Once requester 760 is aware of the location of node 304, requester 760 may establish a connection to node 304.

Although only a few embodiments of the present invention have been described, it should be understood that the present invention may be embodied in many other specific forms without departing from the spirit or the scope of the present invention. By way of example, functionality associated with a virtual node has been described as being provided by a services engine, a communications engine, and a transport engine. However, the framework or architecture used to provide functionality associated with a virtual node is not limited to including a services engine, a communications engine, and a transport engine.

The steps associated with the methods of the present invention may vary widely. Steps may be added, removed, altered, combined, and reordered without departing from the spirit of the scope of the present invention. For example, in lieu of updating a temporary community of interest when a node changes locations, a new temporary community of interest may be established. Therefore, the present examples are to be considered as illustrative and not restrictive, and the invention is not to be limited to the details given herein, but may be modified within the scope of the appended claims.

What is claimed is:

1. A node arrangement, the node arrangement being a virtual node, the node arrangement comprising:
   a services engine, the services engine including at least a first service domain, the first service domain being arranged to provide at least one service associated with a first community of interest;

a communications engine, the communications engine capable of providing at least a first forwarding table, the first forwarding table being associated with the first community of interest and arranged to support reachability for the first service domain; and a transport engine, the transport engine being arranged to manage any exterior connections associated with the node arrangement, the exterior connections not being inside the first service domain.

2. The node arrangement of claim 1 further including:

at least one exterior connection, wherein the transport engine is arranged to maintain the at least one exterior connection.

3. The node arrangement of claim 1 wherein the transport engine is further arranged to publish the first service domain.

4. The node arrangement of claim 1 wherein the services engine includes a second service domain and the communications engine provides a second forwarding table, the second service domain being arranged to provide at least one service associated with a second community of interest, the second forwarding table being associated with the second community of interest and arranged to support reachability for the second service domain.

5. The node arrangement of claim 4 wherein the node arrangement is a member of the first community of interest and the second community of interest, and the transport engine concurrently manages a first exterior connection to the first community of interest and a second exterior connection to the second community of interest.

6. A method of communicating with a first element in a first enterprise and a second element in a second enterprise, the first enterprise being separate from the second enterprise, the method comprising:

maintaining a first active connection between a node and the first element in the first enterprise;

maintaining a second active connection between the node and the second element in the second enterprise;

utilizing a service provided by the first element through the first active connection while maintaining the second active connection;

utilizing a service provided by the second element through the second active connection while maintaining the first active connection;

determining if the first active connection to the first element is to be updated;

identifying a third route, the third route being a route to the first element, if it is determined that the first active connection to the first element is to be updated; and updating a first forwarding table to specify the third route as being associated with the first active connection if it is determined that the first active connection to the first element is to be updated.

7. An apparatus for communicating with a first element in a first enterprise and a second element in a second enterprise, the first enterprise being separate from the second enterprise, the apparatus comprising:

means for maintaining a first active connection between a node and the first element in the first enterprise;

means for maintaining a second active connection between the node and the second element in the second enterprise;

means for utilizing a service provided by the first element through the first active connection while maintaining the second active connection;

means for utilizing a service provided by the second element through the second active connection while maintaining the first active connection;

determining if the first active connection to the first element is to be updated;

identifying a third route, the third route being a route to the first element, if it is determined that the first active connection to the first element is to be updated; and updating a first forwarding table to specify the third route as being associated with the first active connection if it is determined that the first active connection to the first element is to be updated.

8. An apparatus for communicating with a first element in a first enterprise and a second element in a second enterprise, the first enterprise being separate from the second enterprise, the apparatus comprising:

logic that causes a first active connection between a node and the first element in the first enterprise;

logic that causes a second active between the node and the second element in the second enterprise;

logic that causes a service provided by the first element to be utilized through the first active connection while maintaining the second active connection;

logic that causes a service provided by the second element to be utilized through the second active connection while maintaining the first active connection;

logic that causes a determination if the first active connection to the first element is to be updated;

logic that causes a third route to be identified, the third route being a route to the first element, if it is determined that the first active connection to the first element is to be updated; and logic that causes the first forwarding table to be updated to specify the third route as being associated with the first active connection if it is determined that the first active connection to the first element is to be updated.

9. A method for creating a community of interest between a first node arrangement and a second node arrangement within a network, the method comprising:

performing a location-based search to locate the second node arrangement, wherein performing the location-based search includes querying a location that is associated with the second node arrangement, wherein the second node arrangement is nested within the location and the first node arrangement performs the location-based search;

initiating a connection between the first node arrangement and the second node arrangement when the second node arrangement is located; and establishing a community of interest between the first node arrangement and the second node arrangement, wherein establishing the community of interest between the first node arrangement and the second node arrangement includes creating a first forwarding table that identifies a route associated with the connection, the first forwarding table being stored on the first node arrangement.

10. The method of claim 9 wherein the first node arrangement is associated with a second forwarding table, the second forwarding table being associated with a second community of interest that includes the first node arrangement.

11. The method of claim 9 further including:

determining if the second node arrangement has moved relative to the first node arrangement;

updating the connection if it is determined that the second node arrangement has moved relative to the first node arrangement; and updating the first forwarding table, wherein updating the first forwarding table includes updating the route.

12. The method of claim 9 further including:
determining if the connection is to be aborted; and
aborting the connection and the first community of interest if it is determined that the connection is to be aborted.

13. The method of claim 12 wherein determining if the connection is to be aborted includes determining if the connection is in use.

14. An apparatus comprising:
means for performing a location-based search to locate a second node arrangement, wherein the means for performing the location-based search include means for querying a location that is associated with the second node arrangement, wherein the second node arrangement is nested within the location and the first node arrangement performs the location-based search;
means for initiating a connection between the first node arrangement and the second node arrangement when the second node arrangement is located; and
means for establishing a first community of interest between a first node arrangement and the second node arrangement, wherein the means for establishing the first community of interest between the first node arrangement and the second node arrangement include means for creating a first forwarding table that identifies a route associated with the connection, the first forwarding table being stored on the first node arrangement.

15. An apparatus comprising:
logic that causes a location-based search to be performed to locate a second node arrangement, wherein the logic that causes a location-based search to be performed to locate the second node arrangement includes logic that causes a location associated with the second node arrangement to be queried, wherein the second node arrangement is nested within the location and the first node arrangement performs the location-based search;
logic that causes a connection between the first node arrangement and the second node arrangement to be initiated when the second node arrangement is located; and
logic that causes a first community of interest between a first node arrangement and the second node arrangement to be established, wherein the logic that causes the first community of interest between the first node arrangement and the second node arrangement to be established includes logic that causes a first forwarding table that identifies a route associated with the connection to be created, the first forwarding table being stored on the first node arrangement.

16. The apparatus of claim 15 wherein the first node arrangement is associated with a second forwarding table, the second forwarding table being associated with a second community of interest that includes the first node arrangement.

17. The apparatus of claim 15 wherein the second node arrangement is included in the location.

18. The apparatus of claim 15 wherein the second node arrangement is one selected from the group including a distributed application and a network element.

19. The apparatus of claim 15 wherein the first node arrangement is one selected from the group including a distributed application and a network element.

20. An apparatus comprising:
logic that causes a location-based search to be performed to locate a second node arrangement, wherein the logic that causes a location-based search to be performed to locate the second node arrangement includes logic that causes a location associated with the second node arrangement to be queried, wherein the second node arrangement is nested within the location and the first node arrangement performs the location-based search;
logic that causes a connection between the first node arrangement and the second node arrangement to be initiated when the second node arrangement is located;
logic that causes a first community of interest between a first node arrangement and the second node arrangement to be established, wherein the logic that causes the first community of interest between the first node arrangement and the second node arrangement to be established includes logic that causes a first forwarding table that identifies a route associated with the connection to be created, the first forwarding table being stored on the first node arrangement;
logic that causes a determination of whether the second node arrangement has moved relative to the first node arrangement;
logic that causes the connection to be updated if it is determined that the second node arrangement has moved relative to the first node arrangement; and
logic that causes the first forwarding table to be updated, wherein the logic that causes the first forwarding table to be updated includes logic that causes the route to be updated.

* * * * *